(12) United States Patent
Glenn et al.

(10) Patent No.: US 6,319,995 B2
(45) Date of Patent: *Nov. 20, 2001

(54) METHOD OF FEEDING DRY CATALYST TO A POLYMERIZATION REACTOR

(75) Inventors: Thomas A. Glenn, Wilmington; Nadim F. Yaacoub, Joliet; Joel A. Mutchler, Morris; Charles S. Holland, Coal City; Dennis D. Gottschalk, Marseilles, all of IL (US)

(73) Assignee: Equistar Chemicals, LP, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/385,486

(22) Filed: Aug. 30, 1999

(51) Int. Cl.[7] ........................................................ C08F 2/00
(52) U.S. Cl. ................................. 526/64; 526/78; 526/79; 526/86; 526/106
(58) Field of Search ................................. 526/64, 78, 79, 526/86, 106, 901

(56) References Cited

U.S. PATENT DOCUMENTS

| | | | |
|---|---|---|---|
| 3,012,024 | * 12/1961 | Kavesh . | |
| 3,167,398 | 1/1965 | Whittington . | |
| 3,291,784 | 12/1966 | Bebbington et al. . | |
| 3,726,845 | 4/1973 | Nickerson . | |
| 3,790,036 | 2/1974 | Miller . | |
| 3,846,394 | * 11/1974 | Mitacek | 260/93.7 |
| 3,876,602 | 4/1975 | Calvert et al. . | |
| 4,123,601 | 10/1978 | Kellum et al. . | |
| 4,610,574 | 9/1986 | Peters . | |
| 4,774,299 | 9/1988 | Dumain et al. . | |

* cited by examiner

Primary Examiner—David W. Wu
Assistant Examiner—William Cheung
(74) Attorney, Agent, or Firm—William A. Heidrich, III

(57) ABSTRACT

A device and method allow a dry catalyst to be delivered to a liquid-filled polymerization reactor, thus avoiding problems associated with catalyst-liquid contact or with undesired addition of gases to the reactor. A quantity of dry catalyst is transferred from a catalyst reservoir maintained under dry conditions to a catalyst chamber. An inert fluid then enters the chamber to flush the catalyst charge toward the reactor. Optional embodiments include means for precontacting the dry catalyst with a modifier and for removing gas from the fluid line.

22 Claims, 4 Drawing Sheets

METHOD OF FEEDING DRY CATALYST TO A POLYMERIZATION REACTOR

BACKGROUND OF THE INVENTION

1. Field of the invention

The invention relates to a device and a process for feeding a dry catalyst to a liquid-filled polymerization reactor.

2. Description of Prior Art

In polymerization reaction systems, a persistent challenge is introducing catalyst to the reactor and obtaining the desired catalytic effect while minimizing undesired consequences. The problems encountered can vary by the process and catalyst used, and can arise from catalyst degradation, feeding too much or too little catalyst, plugging of feed lines, poor mixing of the catalyst with other materials, or introduction of undesired quantities of carrier materials to the process.

Gas-phase fluidized bed polymerization reactors often employ dry catalyst delivery systems such in U.S. Pat. No. 3,790,036 to Miller showing a compressed gas to deliver catalyst to the reactor. U.S. Pat. No. 3,876,602 to Calvert et al. teaches a system for continuous delivery of gas-entrained dry solid catalyst particles through capillary tubes. More recently, U.S. Pat. No. 4,774,299 to Dumain et al. discloses a device and process for moving dry catalyst powder from a storage chamber to a metering device and then to an intermediate chamber, through which an inert carrier gas is released by a fast-opening valve to sweep the powder to the reactor.

In liquid-filled reactors, however, injection of gas is usually undesirable. For example, in a slurry loop reactor the reaction mixture should not exceed the bubble point, or operability problems could result from free gas in the reactor. In such reactors, catalyst is typically prepared as a liquid or slurry and injected without a gas carrier. An example is U.S. Pat. No. 4,610,574 to Peters in which a dry catalyst and a hydrocarbon liquid are premixed to form a slurry which is sent to a solvent-filled polymerization reactor Existing fluid streams to the reactor can also carry the catalyst U.S. Pat. No. 4,123,601 to Kellum et al. teaches an apparatus to feed controlled quantities of a hydrocarbon-slurried catalyst. A line continuously feeds an inert hydrocarbon liquid to the reactor. In this line a bypass loop is provided which is periodically charged with a predetermined amount of catalyst. At intervals the hydrocarbon liquid is fed through the bypass loop to sweep the catalyst to the polymerization reactor. U.S. Pat. No. 3,846,394 to Mitacek adds diluent at one or more point in the line to help sweep the catalyst to the reactor, thus avoiding problems arising from premature contact of catalyst with the monomer.

While suitable systems exist for delivery of slurried catalysts to liquid-filled reactors, some catalysts suffer from prolonged contact with the hydrocarbons used as solvents or diluents in the process. U.S. Pat. No. 3,012,024 to Kavesh notes this problem and teaches a process for introducing dry catalyst to a solvent-filled polymerization reactor with the object of maximizing catalyst efficiency. A compressed carrier gas such as nitrogen or ethylene conveys the catalyst to the reactor.

It is therefore an object of this invention to provide a device and process for keeping a polymerization catalyst dry before it is fed to a liquid-filled reactor. A second object is to feed precise amounts of catalyst without plugging of feed lines. Another object is to avoid introducing undesirable amounts of gas to such a reactor. A further object is to avoid problems of reactor fouling and deficiencies in catalyst activity, resin powder properties and pellet properties caused by catalyst degradation. Yet another object is to provide a device and method for contacting the dry catalyst with a modifier before it enters the reactor. Still another is to provide a means to increase reactor effectiveness by removing gas from the feed line before it enters the liquid-filled reactor. These and other objects are accomplished by the invention described below.

BRIEF SUMMARY OF THE INVENTION

A novel apparatus and method allow a dry catalyst to be delivered to a liquid-filled reactor.

The apparatus includes a fluid line connected to the reactor with a bypass loop in that line. A valve directs fluid alternately through that line and the bypass loop. A catalyst reservoir holds the catalyst under dry conditions until delivery to a catalyst chamber in the bypass loop. Also included are a means to isolate and vent the bypass line and a means to flush the catalyst charge to the reactor. Optionally included are means for precontacting the dry catalyst with a modifier, and means for removing gas from the fluid line.

The process for delivering the dry catalyst to a reactor includes normally feeding an inert liquid hydrocarbon to a liquid-filled polymerization reactor through a feed line, which has a bypass loop in it. The bypass loop is normally isolated and can be vented to remove the hydrocarbon. A quantity of dry catalyst is transferred from a catalyst reservoir maintained under dry conditions to a catalyst chamber in the bypass loop. The catalyst charge is then flushed from the catalyst chamber toward the reactor by allowing the hydrocarbon to flow through the bypass loop. Optionally included are steps to precontact the dry catalyst with a modifier and to remove gas from the fluid line.

BRIEF DESCRIPTION OF THE DRAWINGS

The seven Figures represent various embodiments of the invention.

DETAILED DESCRIPTION OF THE INVENTION

Figure 1:
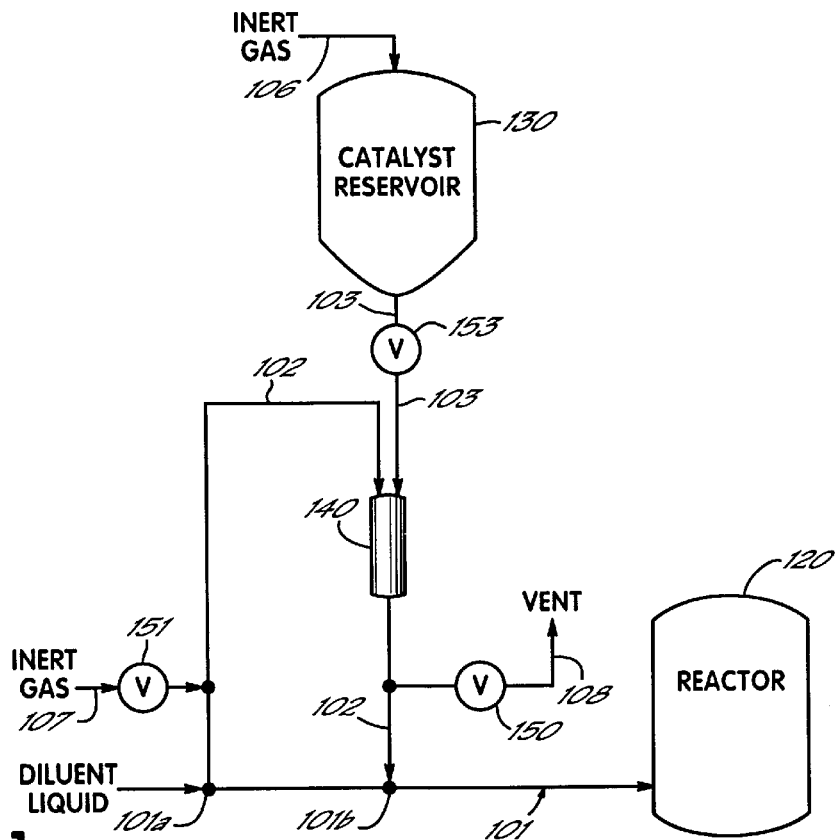
FIG. 1 is a schematic showing a polymerization reactor and the apparatus for feeding a dry catalyst.

The present invention is an apparatus and process for introducing catalyst to a liquid-filled reactor such that the catalyst remains in a dry form until just before it enters the reactor.

The polymerization reactor is "liquid-filled," i.e., entirely or substantially (no less than half) filled with a liquid or slurry that may comprise diluent, catalyst, reactants and polymers. Processes utilizing a liquid-filled reactor include those referred to in the art as the slurry process, solution processes, bulk liquid polymerizations, high pressure processes (using either tubular or atuoclave reactors), also certain cascaded or multiple-reactor processes, all in which polymerization occurs in the liquid phase at elevated temperatures and pressures. The term "liquid-filled" is not meant to encompass the so called vapor-phase or gas phase reactors that are characterized by a stirred bed or fluidized bed of particles and in which the monomers are, at least in some parts of the reactor, in gaseous form. The liquid-filled reactor of the invention may contain gas or inert materials in minor amounts that would not interfere with operation of the process.

The invention is used with any polymerization catalyst that is either normally dry or can be made dry, and thus is advantageously used with supported catalysts. Examples include Ziegler-Natta catalysts, chromium or modified-chromium catalysts (especially those which show poor flowability when contained in a liquid or slurry) and other supported organometallic catalysts such as single-site catalysts or metallocenes. Even if a catalyst is not normally delivered in a dry form, this invention may offer advantages if the catalyst would otherwise not flow well in a liquid or slurried form, or if prolonged exposure to a liquid such as a hydrocarbon solvent might result in catalyst degradation or cause process or product deficiencies.

The term "dry catalyst" means that the catalyst, at the time when it is stored and awaiting transfer to the reactor, is not suspended in a liquid and is not in a slurry form. For purposes of this invention, the term includes catalysts prepared in a liquid solvent and then dried, as well as catalysts applied as a liquid to a porous support material that retains some amount of absorbed liquid. A dry catalyst can contain liquid in an amount up to but less than 100% of the pore volume of the support, preferably less than 90%. Stated by another measure, the amount of liquid should be less than that at which the supported catalyst demonstrates a condition known in the art as "incipient wetness" or begins to lose its dry appearance or dry-flow characteristics. The invention can be used with any support material as taught in the art for these catalysts.

The fluids selected for the apparatus and process of the invention are conveniently but not necessarily chosen from solvents or diluents already being fed to the polymerization reactor. The liquid must be inert to the polymerization catalyst. The selection depends on the type of reactor and the desired conditions therein. Generally $C_3$ to $C_{12}$ hydrocarbons, preferably aromatic and linear or cyclical hydrocarbons, more preferably $C_3$ to $C_7$ alkanes that are liquid or readily liquefied under the process conditions. Hexane is conveniently used; isobutane is especially preferred.

In a preferred embodiment, the catalyst is contacted with a modifier before entering the reactor and, preferably, before being contacted with the diluent. The modifier is selected from materials that may protect it from catalyst poisons such as water, oxygen, sulfur, carbon monoxide or carbon dioxide or may beneficially interact with the catalyst itself. These modifiers are well known in the art. Preferably, the modifier is selected from the group consisting of halogenated hydrocarbons, silanes, metal alkyls, hydrogen, and boron salts. This pre-contacting modifier is preferably the same as but can be different than modifiers that may be fed directly to the polymerization reactor. More preferably, the modifier is an aluminum alkyl such as triethylaluminum.

The advantages of the invention can be illustrated in several preferred embodiments.

EXAMPLE 1

Referring to the drawings, FIG. 1 is a schematic of the basic apparatus. Olefin polymerization reactor 120 is liquid-filled, being substantially filled with a slurry. Line 101 feeds a liquid diluent, isobutane, to reactor 120.

Line 102 begins at an upstream connection point 101-*a* on diluent line 101, flows through catalyst chamber 140, and rejoins line 101 at downstream connection point 101-*b* thus forming a bypass loop. Valves or similar control devices (not shown in FIG. 1) at or near each connection point 101-*a* and 101-*b* direct flow of fluid alternately through line 101 or bypass loop 102.

Catalyst reservoir 130 is a drum or other vessel adapted to hold a large quantity of dry catalyst and maintain it in a substantially dry and free-flowing condition. Inlet line 106 supplies pressurized inert gas, preferably nitrogen, to blanket the catalyst. No liquid contacts the catalyst while stored in the reservoir. Line 103, connecting reservoir 130 to catalyst chamber 140, permits transfer of dry catalyst when valve 153 is open.

Bypass line 102 and catalyst chamber 140 are vented through line 108 connecting to a venting device 150 which preferably comprises a valve and line connecting to a knock-out pot (not shown) held at or near atmospheric pressure. Line 106 placed upstream of catalyst chamber 140 is an inlet for the inert venting gas, controlled by valve 151. The inert gas is preferably nitrogen, but any fluid that is non-reactive with catalyst could be used, including liquefied gases. Normally oxygen, air or oxygen-containing gases, hydrocarbons and mineral spirits would be avoided for this purpose.

Catalyst chamber 140 is constructed to receive a quantity of catalyst and temporarily hold it in a condition substantially dry and free from prolonged contact from reactive feeds or hydrocarbons. Chamber 140 also has inlet and outlet connections to the bypass loop 102. A means is provided, either as part of the chamber itself or in the lines connecting to the chamber, for opening the chamber to communication alternately with the catalyst inlet 103 and the bypass line 102. Although lines 102 and 103 are shown separately entering chamber 140, they can optionally enter at a single point.

EXAMPLE 2

Figure 2:
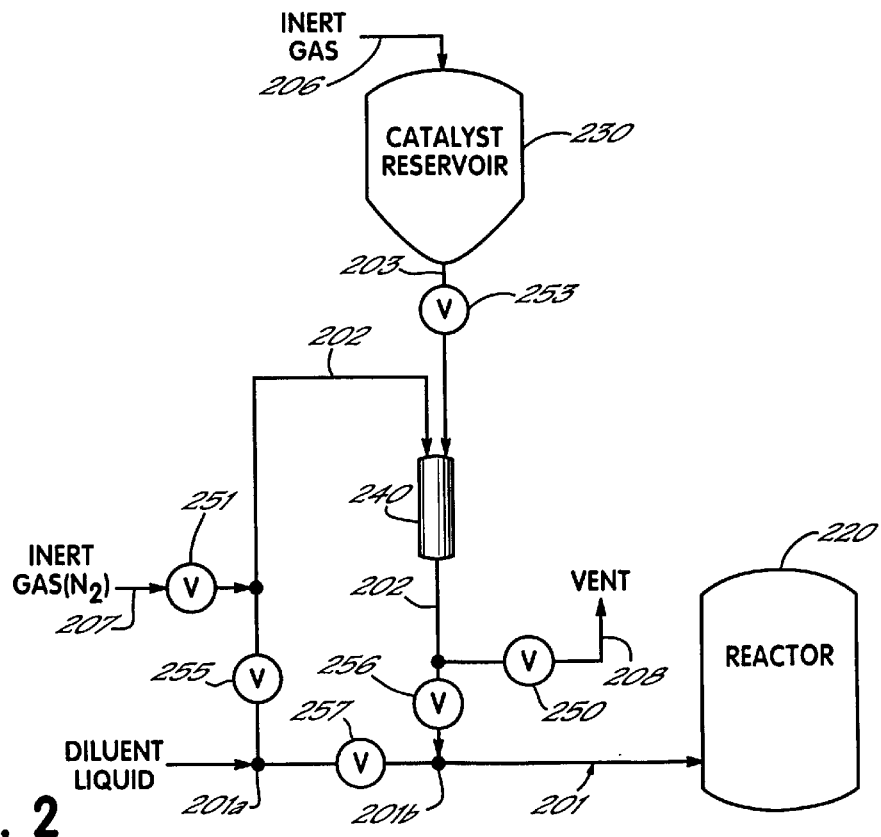
FIG. 2 depicts a process using an apparatus in which chamber 240 can be a rotatable valve.

One embodiment of the apparatus and a process for using it is shown in FIG. 2. Liquid isobutane normally flows through line 201 and open valve 257 into a slurry loop polymerization reactor 220 operated at a nominal pressure of 630 psig. The isobutane is also under pressure, at or slightly above the pressure of the reactor.

Catalyst reservoir 230 contains catalyst under a nitrogen blanket fed via inlet line 206 at superatmospheric pressure, preferably from 50 to 1000 psig, more preferably at or above about 650 psig which represents a pressure slightly above that of the isobutane feed line. The polymerization catalyst in this example is a dry silica-supported catalyst. While held in the reservoir 230 the catalyst is not in a liquid or slurry form but is a free-flowing powder.

Valves 255 and 256 are normally closed to isolate bypass line 202 from isobutane flow. With line 202 isolated from line 201, valve 250 opens to vent the isobutane through line 208 to a vent, knockout pot, flare, or other means for recycling or disposal (not shown). At about the same time, pressurized nitrogen or other inert gas enters line 202 through line 207 controlled by valve 251, thus removing isobutane from line 202 and catalyst chamber 240. Valve 251 then closes and valve 250 also closes, preferably later than valve 251 so that line 202 remains at a lower pressure than line 207 or 203.

Catalyst chamber 240 in this embodiment can be a non-intersecting single- or dual-port four-way plug valve. Catalyst flows from reservoir 230 via line 203, controlled if desired by an optional valve 253. When the catalyst charge is needed, the flow-through port in chamber 240 rotates to align with bypass line 202. Valve 257 closes while valves 255 and 256 open so that isobutane flows through bypass loop 202 and flushes catalyst through chamber 240 toward the reactor 220. The cycle ends with isolation of the bypass loop and resumption of isobutane flow through the feed line, by opening valve 257 and closing valves 255 and 256.

EXAMPLE 3

Figure 3:
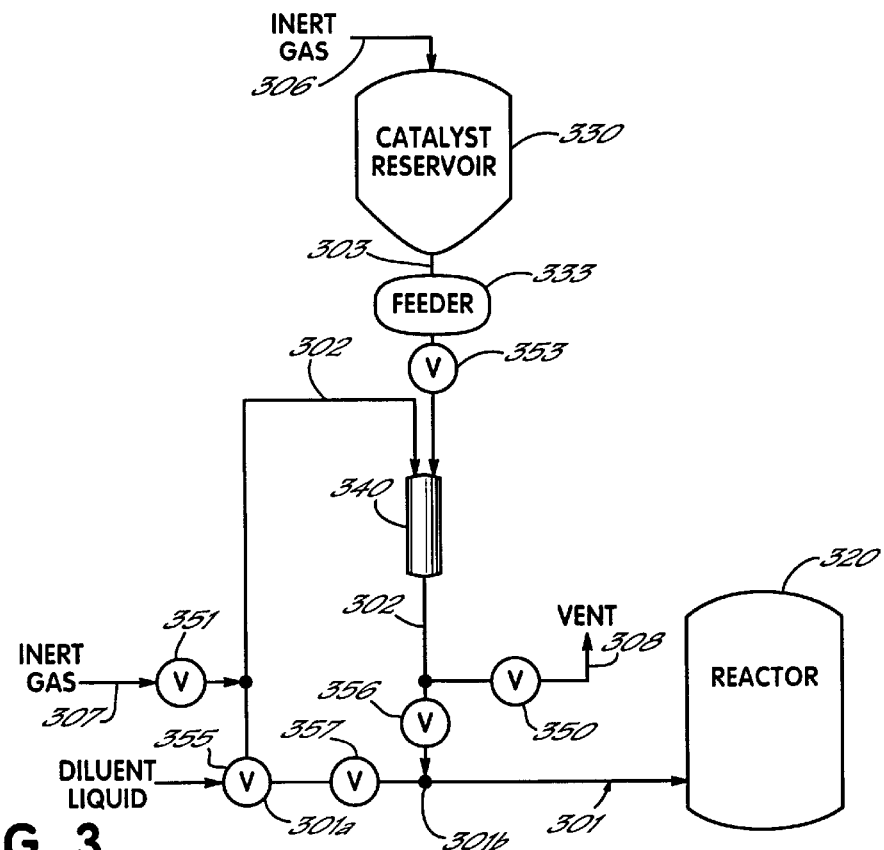
FIG. 3 illustrates a process including a catalyst feeder in line 303.

Another embodiment of the apparatus and process is described with reference to FIG. 3. Isobutane normally flows through line 301 into slurry loop reactor 320. Catalyst reservoir 330 and catalyst are as described above, under nitrogen from line 306.

In the normal position, three-way valve 355 at connecting point 301-a permits flow through line 301, while two-way valves 356 and 357 are normally closed and open, respectively. Bypass line 302 is thus isolated from isobutane flow.

Valve 350 then opens to vent line 302 through line 308. Nitrogen enters from line 307 through valve 351 into line 302 and chamber 340. Valve 351 then closes and valve 350 also closes, preferably so that line 302 is at a lower pressure than line 307 or 303.

Feeder 333 is optionally placed in line 303 between reservoir 330 and valve 353. The feeder 333 can be a type of cup feeder or pocket feeder, such as a single-port ball valve with a partially-drilled port of known volume. The feeder receives a certain quantity of catalyst while minimizing carryover of nitrogen from the catalyst reservoir. Catalyst flows from feeder 333 via line 303 by opening valve 353. In this embodiment catalyst chamber 340 can be a pipe or other simple vessel that communicates with valves 353 and 356 and has sufficient internal volume to hold the catalyst charge from feeder 333. Catalyst then flushes toward the reactor by flow of isobutane through bypass loop 302 and through chamber 340, accomplished by closing valve 357, re-positioning valve 355 and opening valve 356.

The cycle ends with isolation of the bypass loop and resumption of isobutane flow through the feed line by restoring valves 355, 356 and 357 to normal position. Valve 356 is preferably metal-seated to reduce wear from abrasive catalyst particles.

EXAMPLE 4

Figure 4:
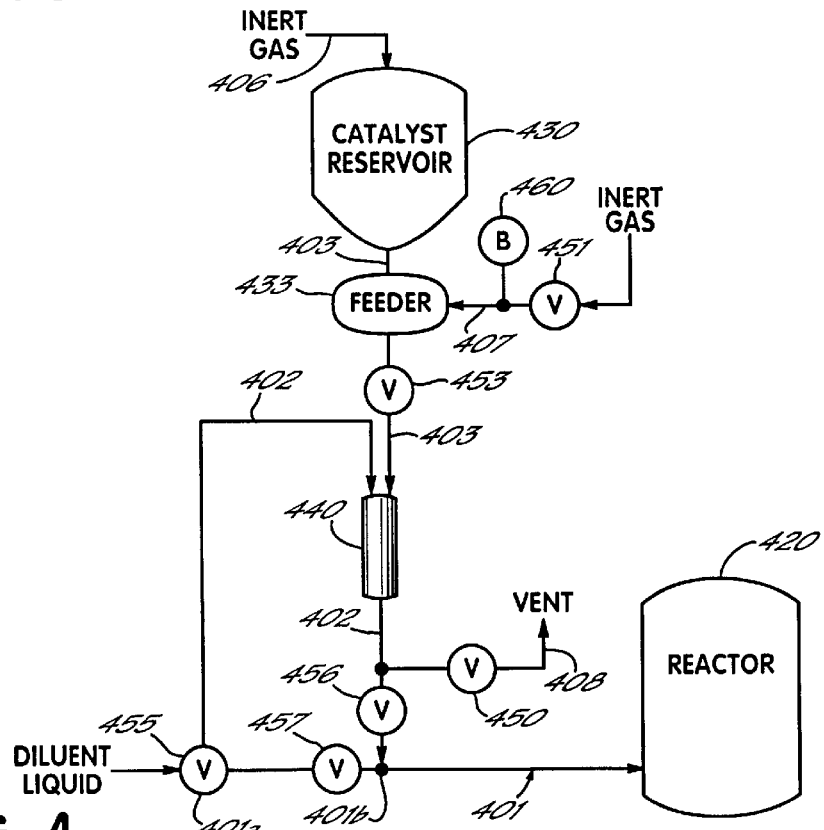
FIG. 4 shows a process including a gas-assisted delivery of the catalyst shot to a catalyst chamber.

Yet another embodiment is shown in FIG. 4. In the normal position, three-way valve 455 at connecting point 401-a permits flow of isobutane through line 401 into slurry loop reactor 420 while two-way valves 456 and 457 are normally in the closed and open positions, respectively. Bypass line 402 is thus isolated from isobutane flow. Valve 450 opens to vent from line 402 through line 408.

Catalyst reservoir 430 and catalyst are as described above, under nitrogen from line 406. Feeder 433, in line 403 between reservoir 430 and valve 453, is of the type described in Example 3. A quantity of catalyst enters when feeder 433 in the vertical position with valve 453 closed. Nitrogen enters through valve 451 in line 407 and pressures bomb 460. Valve 451 then closes and line 407 remains pressurized.

By rotating feeder 433 to a horizontal position, catalyst moves via line 403 by opening valve 453. In this embodiment catalyst chamber 440 can be merely a section of pipe capable of containing that quantity of material. Catalyst flushes toward the reactor by flow of isobutane through bypass loop 402 and through chamber 440, accomplished by closing valves 453 and 457, re-positioning valve 455 and opening valve 456. The cycle ends with isolation of the bypass loop and resumption of isobutane flow through the feed line by restoring valves 455, 456 and 457 to normal position.

EXAMPLE 5

Figure 5:
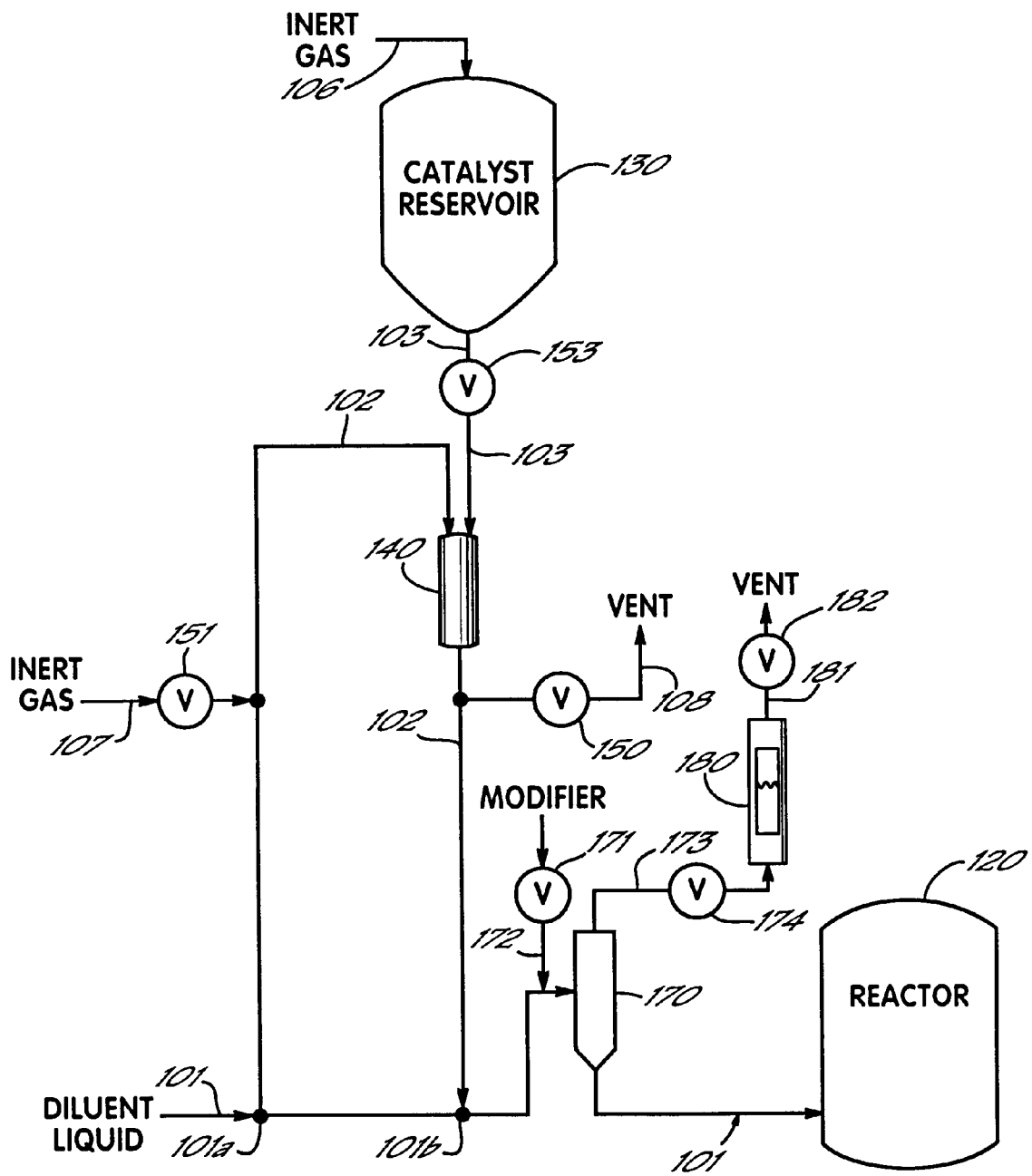
FIG. 5 includes the means to add a modifier and remove inert gas before the catalyst enters the reactor.

Still another embodiment is shown in FIG. 5. The apparatus and process are as described in Example 1, but configured such that line 101 downstream from point 101-b flows through a precontact vessel 170 before returning to line 101. A modifier, here illustrated as a metal alkyl, e.g., an aluminum alkyl such as triethylaluminum, is introduced intermittently or continuously to line 101 (or optionally, directly to vessel 170) through line 172 controlled by valve 171. The alkyl mixes with the catalyst in a mixing zone before entry to the reactor. This pre-contacting alkyl is preferably the same as but can be different than the alkyl that may be fed to the polymerization reactor. Line 173 exiting the top of vessel 170 leading through valve 174 to optional liquid-gas separator 180 providing a means to remove nitrogen or other gases from line 101 before it enters reactor 120. Gas accumulating in separator 180 can be vented as needed through line 181 controlled by valve 182.

The apparatus and process described as drawing references 170–182 in FIG. 5 could be added if desired to the corresponding apparatus and processes described in Examples 2,3 and 4.

EXAMPLE 6

Figure 6:
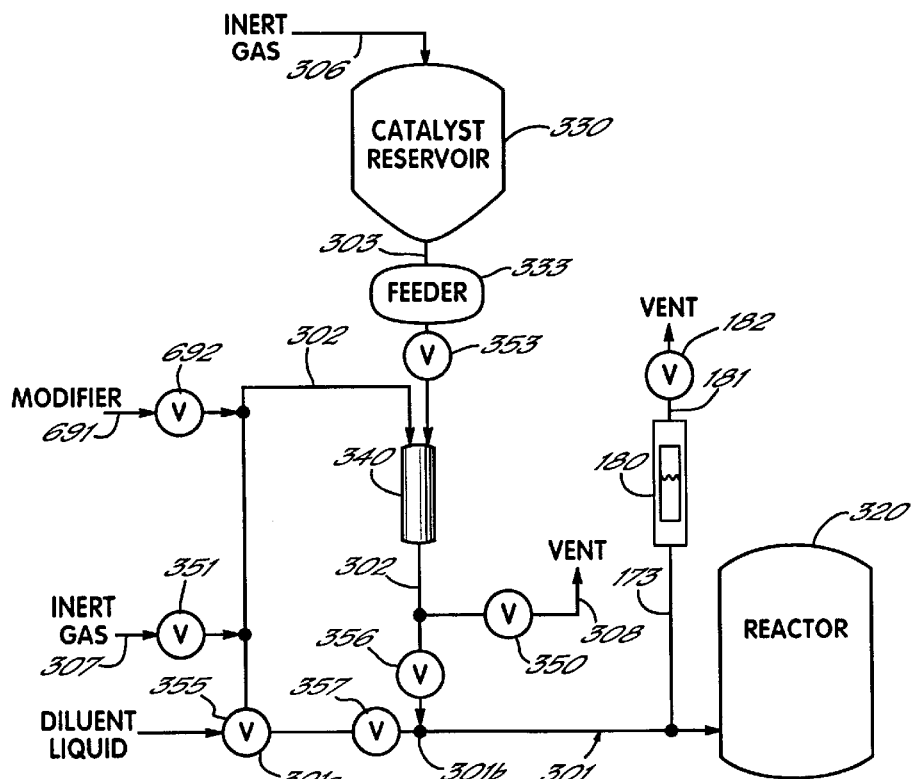
FIG. 6 is a different configuration of an apparatus to add a modifier and remove inert gas.

An optional embodiment is shown in FIG. 6. The apparatus and process are as described in Examples 1 and 3 but with the addition of a line 691 and valve 692 for introduction of a modifier such as a metal alkyl to line 302 or to line 303 before the entry to chamber 340 (or, optionally, directly to catalyst chamber 340). In operation, dry catalyst flows into chamber 340 in the manner described for Example 3. The metal alkyl solution then flows to chamber 340 and contacts the catalyst, still in the absence of diluent, for at least a few seconds, preferably from about one to ten minutes, the time depending on the type of catalyst and the cycle time of the catalyst feeder. Then, isobutane flows through line 302 to flush the catalyst and alkyl toward the reactor. Downstream from the catalyst chamber, conveniently in line 301, a gas-liquid separator system can optionally be added to serve the same function as described in FIG. 5, with line 173 exiting to separator 180. Gas accumulating in separator 180 can be vented as needed through line 181 controlled by valve 182.

EXAMPLE 7

Figure 7:
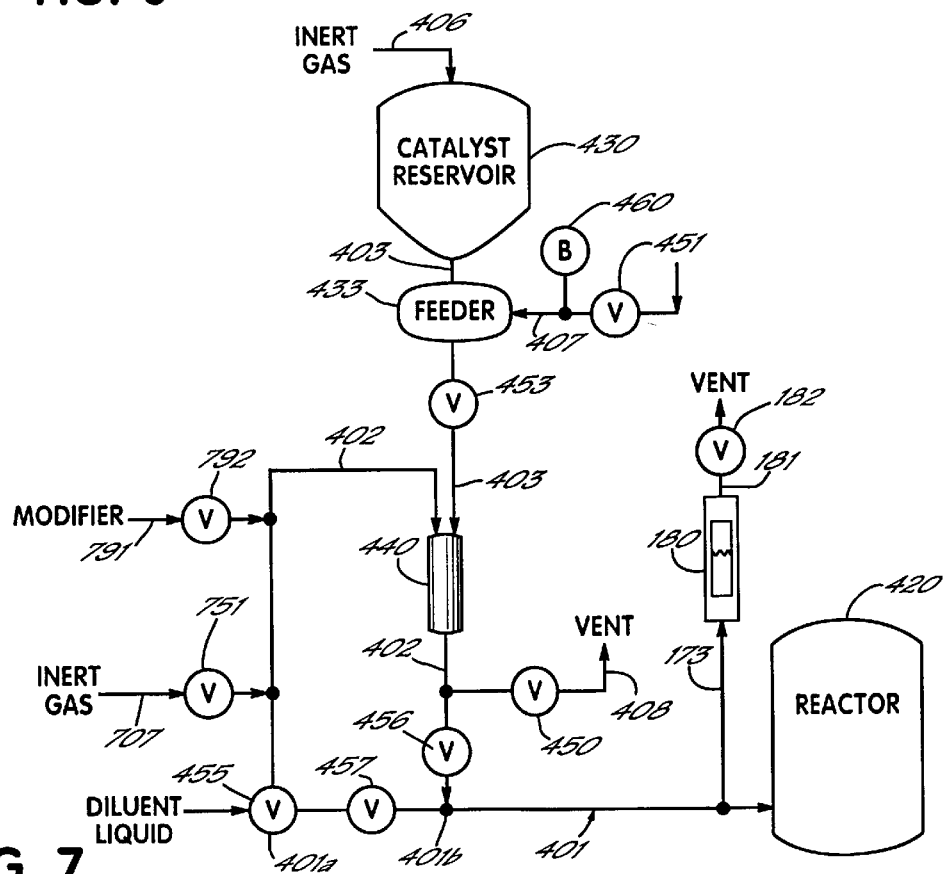
FIG. 7 shows gas-assisted delivery of the catalyst combined with modifier injection and a means to remove gas from the reactor inlet line.

Another optional embodiment is shown in FIG. 7. The apparatus is as described in Example 4, but with the addition of a line 791 and valve 792 for introduction of a modifier to line 402 before entry to chamber 440 (or, optionally, directly to catalyst chamber 440). Inert gas is preferably added to line 402 via line 707 controlled by valve 751. In operation, dry catalyst flows into chamber 440 as described for Example 4. The chamber 440 is then filled with alkyl solution, the catalyst and alkyl solution remain there in contact. Then isobutane flows through line 402 to flush the catalyst and alkyl toward the reactor. Nitrogen gas via line 707 is used to purge line 402 and chamber 440 of isobutane. Downstream from the catalyst chamber 440, conveniently in line 401, a gas-liquid separator system could optionally be added to serve the same function as described in Example 5, with line 173 exiting to separator 180. Gas accumulating in separator 180 can be vented as needed through line 181 controlled by valve 182.

EXAMPLE 8

An apparauts was constructed for feeding dry catalyst to a pilot-scale slurry loop olefin polymerization reactor as described in Example 2.

Lines for isobutane were stainless steel tubing of three-eighths inch (⅜") diameter, while inert gas was supplied via one-quarter inch (¼") tubing. Isobutane was fed at a pressure from 600 to 650 psig and flow rate from 60 to 150 pounds per hour to the slurry loop reactor maintained at from 580 to 630 psig. Pressure regulators were installed to reduce the nitrogen pressure to 740 psig for the catalyst reservoir and to 40 psig for the bypass loop.

A cylinder two-inches in diameter and two feet in height served as the catalyst reservoir, was with a nominal capacity of 0.3 gallons and pressure rating of 1250 psig. It contained a dry catalyst comprising a transition-metal complex supported on silica. The catalyst chamber was a single-port plug valve capable of holding a 2 cc catalyst charge.

Improvements to this basic apparatus could include the additions as shown in FIG. 5. Placed in a line downstream from the catalyst chamber, an alkyl precontact vessel consists of a stainless steel pipe two-inches in diameter by two feet in height, having a side inlet line and a bottom end outlet. The inlet carries the catalyst and isobutane; triethylaluminum or other alkyl is added to this line. The inlet protrudes into the precontact vessel and projects upward to form a reverse dip tube that promotes better mixing and increased catalyst-alkyl contact time. The narrow inlet tube emptying to a larger vessel avoids plug flow of the catalyst charge, so that particles of catalyst will have better contact with the alkyl which is continuously going through the precontact vessel.

Connected to the upper end of the pre-contact vessel is a second outlet leading to a liquid-gas separator, conveniently a high-pressure sight glass about two feet long to allow monitoring of the liquid-gas interface. Nitrogen is trapped in this vessel and can be removed through a valve by manual or automatic means.

Other modifications and embodiments of this invention that are not particularly described above will become apparent to those skilled in this art, and are included within the spirit and scope of the invention which is to be limited only by the following claims.

We claim:

1. A method of feeding dry catalyst to a polymerization reactor comprising the steps of:
    (a) introducing an inert liquid hydrocarbon into a liquid-filled polymerization reactor through a liquid hydrocarbon feed line, said hydrocarbon feed line having two intersections with a bypass loop, a first upstream intersection and a second downstream intersection;
    (b) venting said bypass loop to the atmosphere while introducing said liquid hydrocarbon into said polymerization reactor through said liquid hydrocarbon feed line wherein said first and second intersections with said bypass loop are blocked;
    (c) introducing a quantity of dry catalyst through a catalyst inlet into a catalyst reservoir and thereafter into a catalyst chamber, said catalyst chamber in alternate flow communication with said catalyst reservoir and a section of said bypass loop;
    (d) flushing said dry catalyst into said polymerization reactor from said catalyst chamber by blocking catalyst flow from said catalyst reservoir, unblocking said first and second intersections of said hydrocarbon feed line with said bypass loop and blocking said venting to the atmosphere and said hydrocarbon feed line at a point intermediate between said first and second intersections of said hydrocarbon feed line with said bypass loop; and
    (e) blocking said first and second intersections or said hydrocarbon feed line with said bypass loop and unblocking said hydrocarbon feed line intermediate said first and second intersections with said bypass loop whereby hydrocarbon flow through said hydrocarbon feed line is resumed.

2. The method of claim 1 further comprising introducing an inert gas to the bypass loop while venting the bypass loop.

3. The method of claim 2 in which the inert gas is nitrogen.

4. The method of claim 1 in which the liquid-filled reactor is a slurry loop reactor.

5. The method of claim 1 in which the liquid hydrocarbon is selected from the group consisting of alkanes and aromatic hydrocarbons or mixtures thereof.

6. The method of claim 5 in which the liquid hydrocarbon is an alkane is selected from isobutane or hexane.

7. The method of claim 6 in which the alkane is isobutane.

8. The method of claim 6 in which the alkane is hexane.

9. The method of claim 1 in which the catalyst is a Ziegler-Natta catalyst.

10. The method of claim 1 which the catalyst is an organometallic single-site catalyst.

11. The method of claim 1 in which the catalyst contains chromium.

12. The method of claim 9, 10 or 11 in which the catalyst is supported on an inorganic oxide support.

13. The method of claim 12 in which the support is silica.

14. The method of claim 1 further comprising contacting the catalyst with a modifier after the catalyst has left the catalyst reservoir and but before the catalyst enters the reactor.

15. The method of claim 14 in which the modifier contacts the catalyst in the catalyst chamber.

16. The method of claim 14 in which the modifier contacts the catalyst at a point downstream from the catalyst chamber.

17. The method of claim 14 in which the modifier is a metal alkyl is selected from the group consisting of triethylaluminum, trimethylaluminum, triisobutylaluminum, methylalumoxane and modified methylalumoxane.

18. The method of claim 1 further comprising removing gas from the hydrocarbon at a point in the fluid line downstream from catalyst reservoir and but upstream from the reactor.

19. The method of claim 1 further comprising maintaining the catalyst reservoir under an inert gas at superatmospheric pressure.

20. The method of claim 1 in which the catalyst chamber is a rotatable valve.

21. The method of claim 1 in which the dry catalyst, while passing from the catalyst reservoir to the catalyst chamber, also passes through a catalyst feeder.

22. The method of claim 20 further comprising the use of pressurized inert gas to transfer the dry catalyst from the catalyst feeder.

* * * * *